United States Patent

Pagani

[11] Patent Number: 5,992,445
[45] Date of Patent: Nov. 30, 1999

[54] FLOAT UNIT FOR CONTROLLING THE FILLING LEVEL OF LIQUID GASES IN VESSELS

[75] Inventor: Angela Pagani, Calcinato, Italy

[73] Assignee: Cavagna Group International B.V., Amsterdam, Succursale di Lugano, Lugano, Switzerland

[21] Appl. No.: 09/121,782

[22] Filed: Jul. 23, 1998

[30] Foreign Application Priority Data

Jul. 31, 1997 [IT] Italy .................................. MI97A1846

[51] Int. Cl.[6] ........................... F16K 31/24; F16K 33/00; F16K 43/00
[52] U.S. Cl. ........................... 137/315; 137/444; 137/446; 141/198
[58] Field of Search ..................... 137/442, 444, 137/446, 434, 15, 315, 443, 439; 141/198; 73/322.5

[56] References Cited

U.S. PATENT DOCUMENTS

| 972,331 | 10/1910 | Carson | 137/446 |
|---|---|---|---|
| 1,384,450 | 7/1921 | Greeson | 137/446 |
| 1,476,029 | 5/1921 | Black | 137/446 |
| 4,286,619 | 9/1981 | Straus | 137/444 |
| 4,483,367 | 11/1984 | Ross, Jr. et al. | 137/444 |
| 5,282,496 | 2/1994 | Kerger | 137/442 |

Primary Examiner—George L. Walton
Attorney, Agent, or Firm—Cantor Colburn LLP

[57] ABSTRACT

A float unit for controlling the filling level of liquid gases in vessels, cylinders and the like, comprises a valve body which can be associated with a cylinder and defines a fork body whereto a float member is swingably connected, the float unit further comprising a coupling element for removably coupling the float member to the fork body.

7 Claims, 2 Drawing Sheets

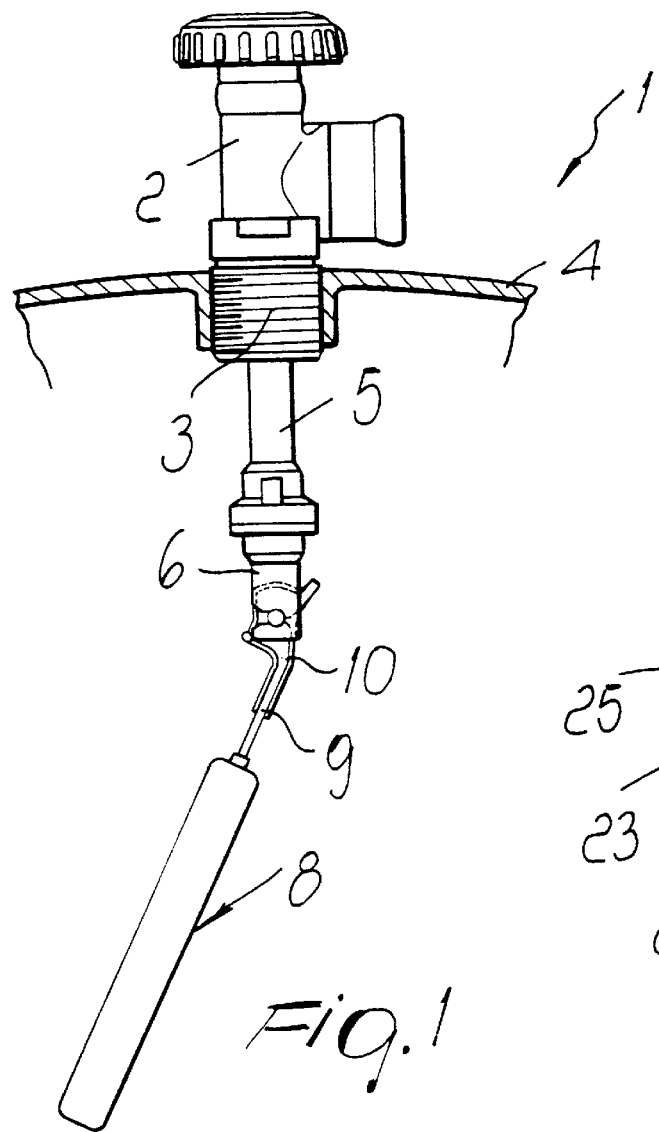
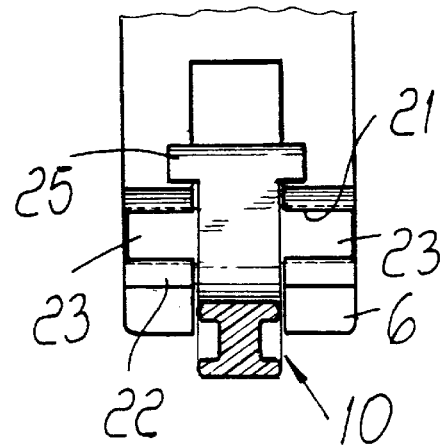
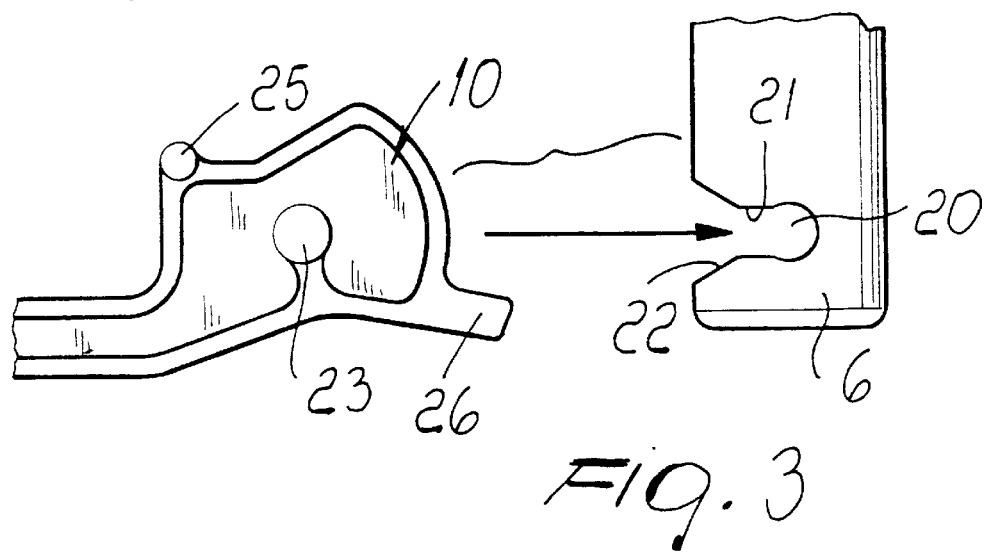
Fig. 1
Fig. 4
Fig. 3

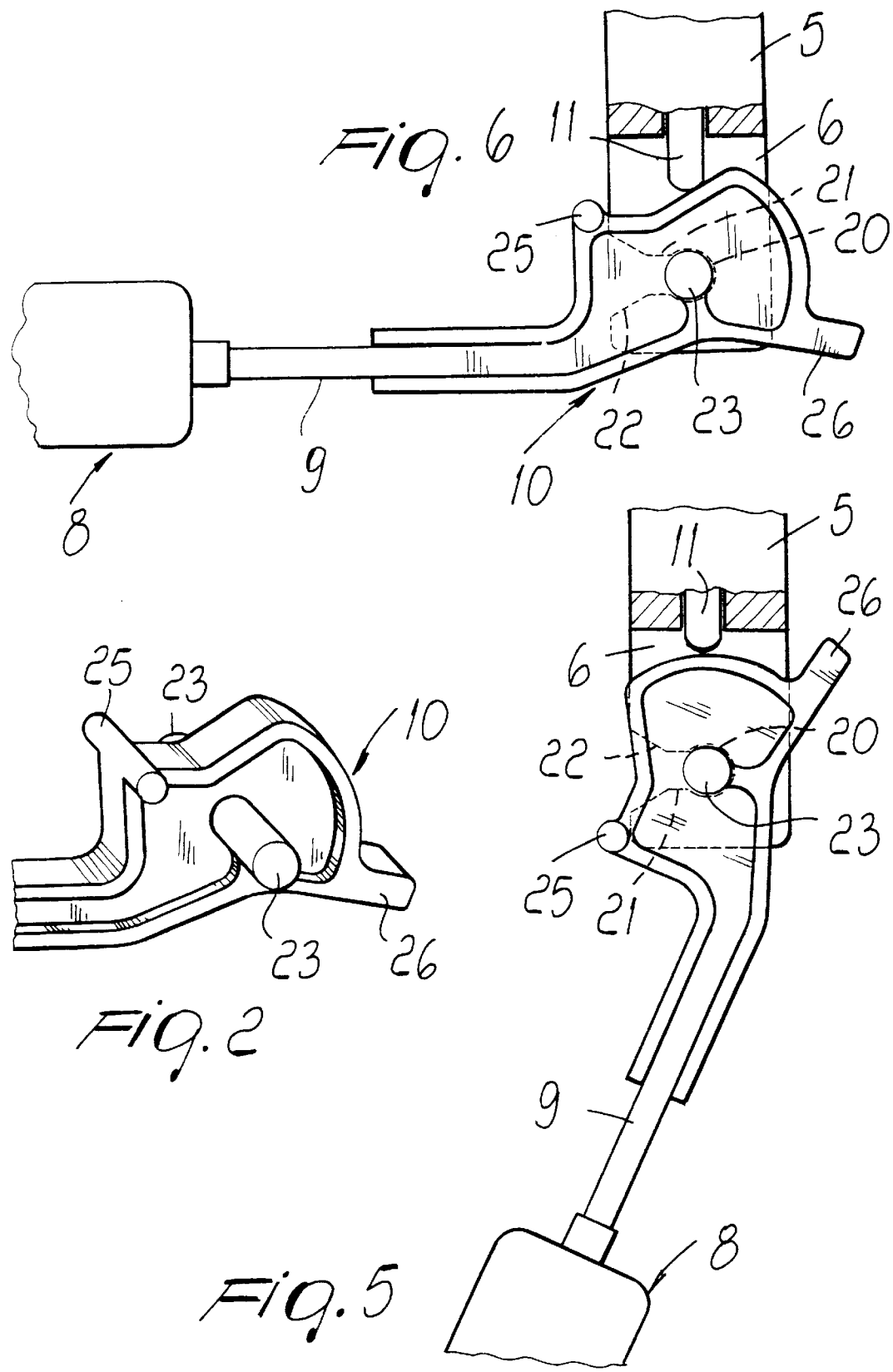

FLOAT UNIT FOR CONTROLLING THE FILLING LEVEL OF LIQUID GASES IN VESSELS

BACKGROUND OF THE INVENTION

The present invention relates to a float unit for controlling the filling level of liquid gases in vessels, cylinders and the like.

As is known, the float units used in liquid gas cylinders that have to be filled substantially consist of a valve body which can be associated with the cylinder, from which a stem extends having at its lower part a fork whereto a float member is swingably hinged which is usually provided with a cam for operating the valve element.

This conventional float unit which is used worldwide, suffers the drawback of being very bulky particularly during storing and shipping, since the float member usually lies on the stem extension of the valve body, thus being cumbersome.

Moreover, it is necessary to take adapted provisions during packaging in order to avoid breakage of the hinge area between the float member and the fork body of the valve body.

SUMMARY OF THE INVENTION

The aim of the present invention is to eliminate the above-mentioned drawbacks by providing a float unit for controlling the filling level of liquid gases in cylinders and the like, which allows to considerably reduce the overall dimensions when the valve body is not installed on the cylinder, thus making storing and shipping easier.

Within the scope of this aim, a particular object of the present invention is to provide a float unit which does not require particular provisions for protecting the hinge area between the float member and the valve body during storing and shipping, thus simplifying the assembly steps.

Another object of the present invention is to provide a float unit for controlling the filling level of liquid gases in cylinders and the like which, thanks to its peculiar characteristics, is highly reliable and safe in use.

Another object of the present invention is to provide a float unit which can be easily manufactured by using commercially available elements and materials, and which is also competitive from an economical point of view.

BRIEF DESCRIPTION OF THE DRAWINGS

This aim, these objects as well as others which will become apparent from the following detailed description are achieved by a float unit for controlling the filling level of liquid gases in cylinders and the like, given only by non-limitative example, in the accompanying drawings, wherein:

FIG. 1 is a schematic view of a float unit according to the invention, applied to a cylinder;

FIG. 2 is a schematic view of the cam portion connected to the float member;

FIG. 3 is an exploded view of the removable coupling means;

FIG. 4 is a front view of the coupling arrangement between the float member and the fork body;

FIG. 5 is a schematic view of the float unit in the assembled condition, during the filling step;

FIG. 6 shows the float unit in the assembled position, at the end of the filling.

DESCRIPTION OF THE PREFERRED EMBODIMENTS

With reference to the above figures, the float unit for controlling the filling level of liquid gases in cylinders and the like, generally designated by the reference number 1, comprises a valve body 2 which is known per se and is provided with a threaded shank 3 for a tight connection to a cylinder 4.

A stem 5 extends from the valve body inside the cylinder and terminates in a fork body 6.

A float member 8 is coupled to the fork body 6, with the float member being provided with an arm 9 ending with a cam element 10, which actuates the control piston 11 of the valve body.

The peculiarity of the invention consists in that coupling means are provided for removably coupling the float member 8 with the fork body element 6.

The removable coupling means consists of a seat 20 defined on the branches of the fork element 6 which, through a narrowing groove 21, is connected to a port facing outwards and provided with a lead-in countersink 22.

A transverse central pin 23 is provided on the cam 10 which may be snap-fitted in the seat 20 by overcoming the opposition caused by the groove 21. The pin 23 protrudes from the cam body 10 so as to allow coupling by snap fitting into the seat 20, whereby to provide the hinge coupling which enables the float member to freely oscillate.

The cam body 10 advantageously has a transverse stop peg 25 which, upon upward oscillation of the float member 8, engages with the fork body to limit such upward movement thereof, whereas a lug 26 provided on the opposite side with respect to the central pin 23 limits the downward oscillation of the float member 8.

It will thus be noted that the float unit according to the invention achieves the intended aim and objects, in that it is possible to completely separate the float member 8 from the valve body, thus allowing to store and ship the float unit as two separate elements, i.e. the valve body and the float member. This remarkably reduces the bulk and above all prevents the hinge area from being damaged.

When required for use, a snap coupling of the float member is rapidly and easily carried out by inserting the centre pin 23 within the seat 20.

The invention thus conceived is susceptible of numerous modifications and variations all of which are within the scope of the inventive concept.

All the details may further be replaced with other technically equivalent elements.

In practice, the materials employed as well as the shapes and dimensions may be any according to requirements.

The disclosures in Italian Patent Application No. MI97A001846 from which this application claims priority are incorporated herein by reference.

What is claimed is:

1. A float unit for controlling the filling level of liquid gases in vessels, comprising:

a valve body being associable to a vessel body;

a fork body provided on a portion of said valve body, said fork body having a seat portion formed therein, said seat portion including an entrance portion tapering to a narrow groove portion contiguous thereto; and a float member being swingably and removably coupled to said fork body within said seat portion, said float member being removably inserted through said entrance portion and into said narrow groove portion, wherein said float member has a securing member extending therefrom, said securing member being snap-fitted into said narrow groove portion to fixedly secure said float member to said fork body.

2. The float unit of claim 1, wherein said narrow groove portion of said seat flares outwards in lead-in countersinking.

3. The float unit of claim 1, further comprising:

a central pin associated to said float member, said central pin being coupleable with said fork body by snap fitting into said seat.

4. The float unit of claim 3, wherein said float member further comprises:

a cam body, said central pin protruding centrally from said cam body.

5. The float unit of claim 3, wherein said cam body includes:

a stop peg provided at said float member for limiting upward oscillation thereof; and a stop lug for limiting downward oscillation of said float member.

6. The float unit of claim 1, wherein said seat is formed on branches of said fork body.

7. The float unit of claim 1, wherein said float member includes:

an arm at one end of said float member, wherein said arm terminates with a cam body having a central pin protruding centrally from said cam body, said pin received in said seat for snap fitting engagement between said float member and said fork body.

* * * * *